(Model.)
H. LEITNER.
METHOD OF MANUFACTURING ELECTRODES FOR SECONDARY BATTERIES.
No. 589,842. Patented Sept. 14, 1897.
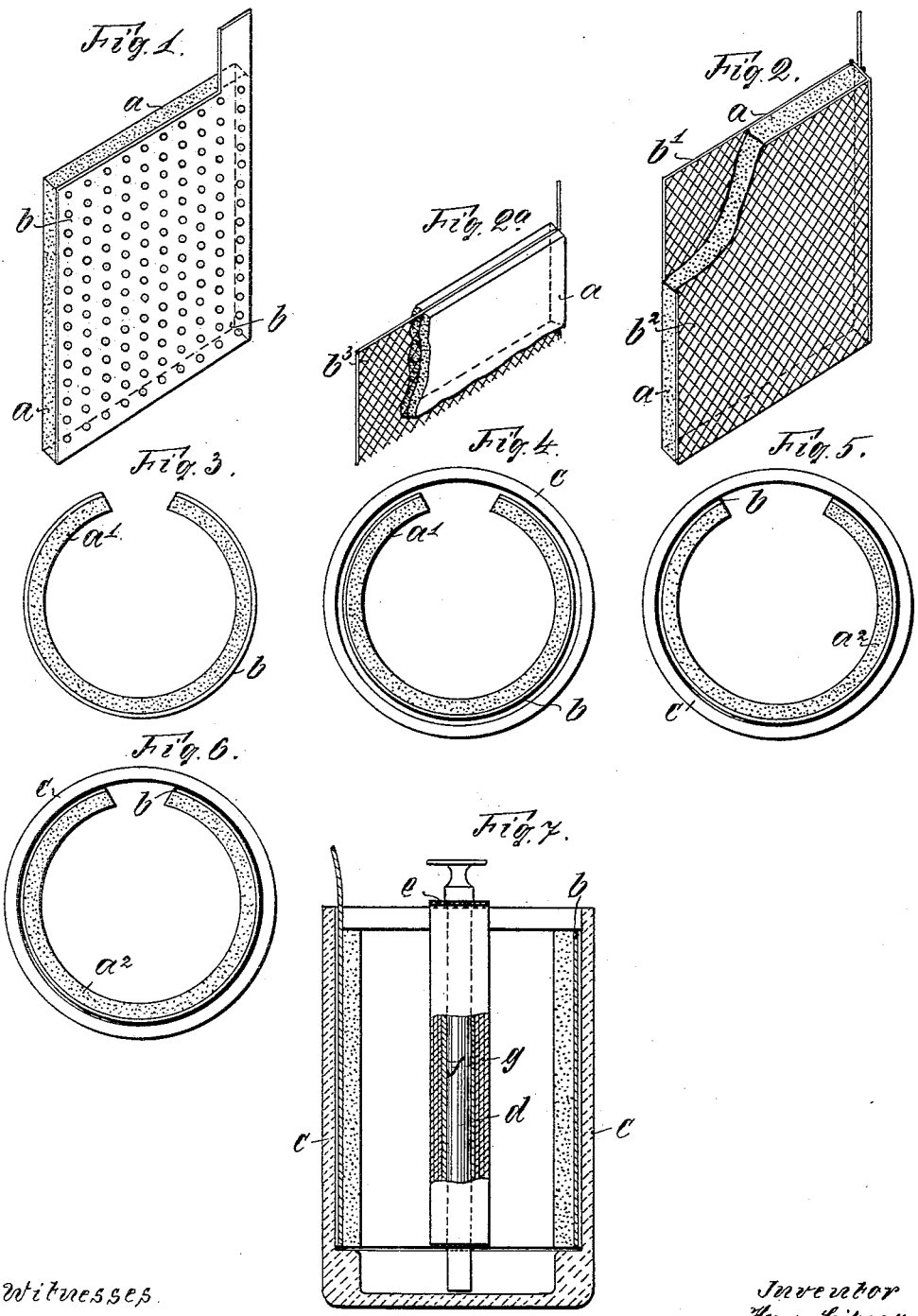

UNITED STATES PATENT OFFICE.

HENRY LEITNER, OF NIEDERSCHÖNHAUSEN, GERMANY.

METHOD OF MANUFACTURING ELECTRODES FOR SECONDARY BATTERIES.

SPECIFICATION forming part of Letters Patent No. 589,842, dated September 14, 1897.

Application filed January 23, 1896. Serial No. 576,571. (Specimens.)

*To all whom it may concern:*

Be it known that I, HENRY LEITNER, a subject of the Queen of Great Britain and Ireland, and a resident of Niederschönhausen, near Berlin, in the Kingdom of Prussia, German Empire, have invented a new and useful Method of Manufacturing Electrodes for Secondary Electric Batteries, of which the following is an exact specification.

This invention relates in general to a secondary electric battery or cell which in comparison to its capacity possesses a very low weight, and which after having been electrically charged may remain unused for a very long time without undergoing any material change in the chemical or mechanical constitution of its electrodes. There are during this time of rest no chemical reactions whatever, and there is also during the time of discharge no appreciable development of vapors or gases. These advantages are arrived at by using electrodes, especially negative electrodes, of a special kind or nature, and my invention relates, therefore, in particular to the method of manufacturing these said electrodes.

My method consists, briefly, in first finely powdering and intimately mixing a combination of lead, preferably oxid of lead, with carbon; second, converting that mixture into a pulp or stiff paste by aid of a suitable medium, such as molasses, or linseed-oil, but preferably glycerin, which gives a chemical reaction with the lead oxid; third, forming said pulp into flat or curved plates, and, fourth, reducing the latter electrochemically to porous lead. Said four phases are followed by a fifth, which consists in subjecting said porous plates to pressure. These processes are more fully described hereinafter.

In order to make my invention more clear, I refer to the accompanying drawings, in which similar letters refer to similar parts throughout different views, and in which—

Figure 1 is a view of a thin flat pierced plate of lead covered with a thick layer of the said pulp, phase 3. Fig. 2 is a similar view showing a modification, the plate of lead-foil being replaced by lead meshes on both sides. Fig. 2ª shows a portion of an electrode having the lead network placed in the center of the mass. Fig. 3 is an upper view of a curved electrode. Fig. 4 shows the same electrode placed in a receptacle. Figs. 5 and 6 are similar views representing the negative electrode in two different stages, and Fig. 7 is a vertical section through a secondary element manufactured according to my invention.

In carrying my invention into effect I first produce a very intimate mixture of ninety-five portions of oxid of lead with five portions of retort-carbon by grinding both materials simultaneously in a suitable apparatus, preferably in a mill, and I then add to said mixture twenty-five portions of glycerin. This mass is then kneaded until it grows stiff. When commencing to grow stiff, a spontaneous heating of the mass indicates that a chemical reaction between said glycerin and the oxid of lead takes place. After said reaction is completed the mass is no longer moldable or plastic, but is hard and brittle. Before letting the mass assume this state it is distributed in a somewhat thick layer $a$, Fig. 1, upon a thin sheet of pierced lead $b$, Fig. 1, or, preferably, upon both sides of a piece of lead network $b^3$, Fig. 2ª, with wide meshes. After that it is allowed to become hard and dry. The plate thus formed is now subjected for about one hundred hours to the action of an electric current in a bath containing sulfuric acid, and the compound of oxid of lead and glycerin is thereby reduced to lead, this lead being, however, perfectly porous (not spongy) and having a fracture very similar to that of carbon. During these electrochemical reactions acrolein and acrylic acid are freely produced, so that the electrolyte should be changed from time to time, and after the completion of the process every trace of free glycerin, acrylic acid, aldehyde, &c., must be carefully washed out or otherwise removed. Although the plate when in this state might be used as an electrode, it is preferable to subject the porous lead plate to a strong pressure in molds, so as to increase the density of the same. In this state the porous lead is so extremely plastic that it may be pressed into any shape—for instance, into the cylindrical shape $a'$ $b$, Fig. 3. I prefer cylindrical electrodes, as I then attain the special advantage that the internal expansion forces coming into play within the electrode and tending (in a plate) to deform the same are caused to act in a useful and desired direction. This peculiar behavior will appear more clear if it is borne in mind that on transforming lead into superoxid of lead the bulk of said lead is increased, and that, further, the degree of increase is the greater the greater the mass of lead contained within a given volume. If, therefore, the pores of the porous plate of lead are diminished in size, not in number, the volume of the lead becomes correspondingly smaller, but the quantity of lead to be converted into superoxid of lead is just the same as before. When thereafter said compressed porous lead is turned into superoxid of lead, the volume or bulk of the latter becomes considerably larger, but not so large as if the porous plate had not been compressed. There results from said limited increase in bulk a very strong coherence of the particles of superoxid formed, and an electrode is thereby secured capable in a high degree of resisting destructive influences. There results further (provided the electrode, as well as the vessel $c$, Figs. 4 to 6, containing the same be circular or cylindrical) an increase in the curvature of said electrode or an elongation of the radius of curvature, respectively, in consequence of which said electrode presses itself firmly and tightly against the wall of the vessel, Fig. 5. The proper shape of the electrode cannot from that moment alter any more, provided there be left between the vertical edges of the electrode $a^2 b$ a slot allowing of a sufficient radial expansion of the said electrode, Fig. 6.

I wish to call special attention to the fact that the uniform curving and lengthening of the finished electrode (on having its lead converted electrically into superoxid of lead) depends greatly on the fineness of the pulverization of the oxid of lead and retort-carbon originally employed and on the uniform distribution of said retort-carbon within or among said oxid of lead. Great care should therefore be taken with regard to the latter two points. The same attention should of course be paid if the electrodes to be produced are flat. The uniform reduction of said mixture to porous lead and the uniform distribution of the pores within the resultant lead entirely depend on the care exercised in these respects.

A peculiar feature of my novel negative electrodes consists in the fact that the reduction does not commence at the side or surface having the thin plate of lead $b$ or the pieces of net $b'$ $b^2$, respectively, attached to it, but at that side or surface which is farthest away. If the electrode is made with a network of lead in the middle of the mass $b^3$, Fig. 2$^a$, said reduction commences also at the two outer surfaces.

The oxidation of the reduced plate on charging the accumulator proceeds similarly from the outside to the inside. The innumerable fine particles of carbon cause the current to perform its work with perfect uniformity about the whole outer surface of the (straight or curved) electrode and from thence perfectly uniformly through the whole mass.

If cylindrical electrodes are to be produced, I prefer to bend the electrode under pressure in molds after the mass (consisting of oxid of lead, retort-carbon, and glycerin) has been reduced to porous lead. The plate after being treated in the manner just stated is at first flexible or pliable, but becomes after some hours hard and brittle, so that no bending whatever of the plate can then take place. The fact that the electrode after being pressed and bent becomes spontaneously hot shows that again a chemical reaction occurs within the same. This may well be explained by parts of the electrolyte (sulfuric acid) remaining within the mass or being sucked up by the particles of carbon becoming now concentrated and in the presence of oxygen of the air giving rise to local electrochemical reactions between the lead and carbon ingredients of the plate. After the hot electrode has cooled it is, as mentioned, hard and firm (though brittle) and of less weight than before. At the same time it retains its perfect electrical conductivity.

Having now finished the description of the negative electrode, I proceed to describe, for the sake of completeness, the positive one. The latter is composed of a rod $d$, Fig. 7, consisting, preferably, of ebonite. This rod is covered to within a few inches of the bottom with a piece of tube $f$, consisting of lead. This piece of tube is first amalgamated, and then a layer $f$ of zinc is electrolytically deposited thereon. The amalgamation, as well as the electrolytic covering with zinc, should be repeated several times. By first covering the positive electrode that way I attain the advantage that the zinc deposited thereafter in charging is more evenly deposited and that then it is only this latter zinc which is consumed on discharging the cell. The positive electrode is suspended by means of the cross-stay $e$, that is itself supported by the receptacle $c$.

The electrolyte preferred by me consists of an acidulated concentrated solution of sulfate of zinc within which alum is dissolved up to saturation.

The terms "positive" and "negative" are used with reference to the battery when discharging, in which case the zinc is the positive electrode or anode.

Having thus fully described the nature of this invention, what I desire to secure by Letters Patent of the United States is—

1. The method of manufacturing electrodes for secondary electric batteries, consisting in finely powdering and intimately mixing about ninety-five per cent. oxid of lead with about five per cent. carbon; turning that mixture into a pulp by aid of a suitable medium; forming said pulp into a flat or curved plate by distributing it upon a sheet of pierced lead, or upon a piece of lead network; letting the pulp become hard; reducing it to porous lead by exposing the plate to the action of an electric current, and subjecting said plate to a high pressure, for the purpose as described.

2. The method of manufacturing electrodes for secondary electric batteries, consisting in finely powdering and intimately mixing oxid of lead with retort-carbon; turning that mixture into a pulp by aid of glycerin; forming said pulp into a plate by distributing it upon a sheet of pierced lead or upon a piece of lead network; letting the pulp become hard; reducing the pulp to porous lead by exposing the plate to the action of an electric current; subjecting said plate to a high pressure, and bending it into cylindrical shape, for the purpose as described.

In testimony whereof I have signed this specification in the presence of two subscribing witnesses.

HENRY LEITNER.

Witnesses:
FRITZ SPERLING,
R. HERPICH.